(12) United States Patent
Dutta

(10) Patent No.: US 7,213,204 B1
(45) Date of Patent: May 1, 2007

(54) METHOD, SYSTEM, AND PROGRAM FOR SAVING OBJECT CONTENT IN A REPOSITORY FILE

(75) Inventor: Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 09/561,181

(22) Filed: Apr. 27, 2000

(51) Int. Cl.
*G06N 3/00* (2006.01)

(52) U.S. Cl. .................................... 715/530
(58) Field of Classification Search .......... 707/10, 707/3; 715/501.1, 513, 533, 530, 517, 523; 704/4, 1
See application file for complete search history.

(56) References Cited

U.S. PATENT DOCUMENTS

| | | | |
|---|---|---|---|
| 5,117,349 A * | 5/1992 | Tirfing et al. ................. 707/3 |
| 5,572,643 A | 11/1996 | Judson |
| 5,649,186 A * | 7/1997 | Ferguson ..................... 707/10 |
| 5,708,825 A | 1/1998 | Sotomayor |
| 5,737,619 A | 4/1998 | Judson |
| 5,745,360 A | 4/1998 | Leone et al. |
| 5,761,683 A | 6/1998 | Logan et al. |
| 5,802,514 A * | 9/1998 | Huber ............................ 707/4 |
| 5,854,897 A | 12/1998 | Radziewicz et al. |
| 5,933,811 A | 8/1999 | Angles et al. |
| 5,933,827 A * | 8/1999 | Cole et al. .................... 707/10 |
| 5,948,061 A | 9/1999 | Merriman et al. |
| 6,005,564 A | 12/1999 | Ahmad et al. |
| 6,018,748 A | 1/2000 | Smith |
| 6,021,435 A | 2/2000 | Nielsen |
| 6,038,668 A * | 3/2000 | Chipman et al. ........... 713/201 |
| 6,226,630 B1 * | 5/2001 | Billmers ......................... 707/3 |
| 6,295,092 B1 | 9/2001 | Hullinger et al. |
| 2002/0056098 A1 | 5/2002 | White |

OTHER PUBLICATIONS

Mark R. Brown, et al. (Brown), Special Edition Using NetscapeTM 2, pp. 213-215, 218, 1995.*
A. Peterson, "Watching the Web-WSJ Interactive Edition", [online], [retrieved Apr. 9, 2000]. Retrieved from the Internet <URL:http://www.quickbrowse.com/press/wsj/Jan. 20, 2000.
"Quickbrowse-Tour: What does Quickbrowse do?". [online]. [retrieved Apr. 9, 2000]. Retrieved from the Internet: <URL: http://www.quickbrowse.com/cgi-bin/aqb_html_demo2.pl?lang_en.
"Quickbrowse-Tour: Why is it useful?". [online]. [retrieved Apr. 9, 2000]. Retrieved from the Internet: <URL: http://www.quickbrowse.com/cgi-bin/aqb_html_demo3.pl?lang_en.
J.Regan, "Cybercoverage: Site Reviews", [online], [retrieved Apr. 9, 2000]. Retrieved from the Internet: <URL: http://www.quickbrowse.com/press/christianscience/.

* cited by examiner

*Primary Examiner*—Stephen Hong
*Assistant Examiner*—Kyle R. Stork
(74) *Attorney, Agent, or Firm*—David W. Victor; Konrad Raynes & Victor LLP

(57) ABSTRACT

Disclosed is a method, system, and program for saving content of electronic objects displayed in a computer viewer program. Content of an object is presented in an interface generated by the viewer program. User selection of a command is received with respect to the presented object content. In response to the user selection of the command, a determination is made of a repository file. The content of the selected object is appended to the determined repository file. The repository file is capable of including content from multiple objects appended to the repository file in response to previous user selections of the command.

27 Claims, 3 Drawing Sheets

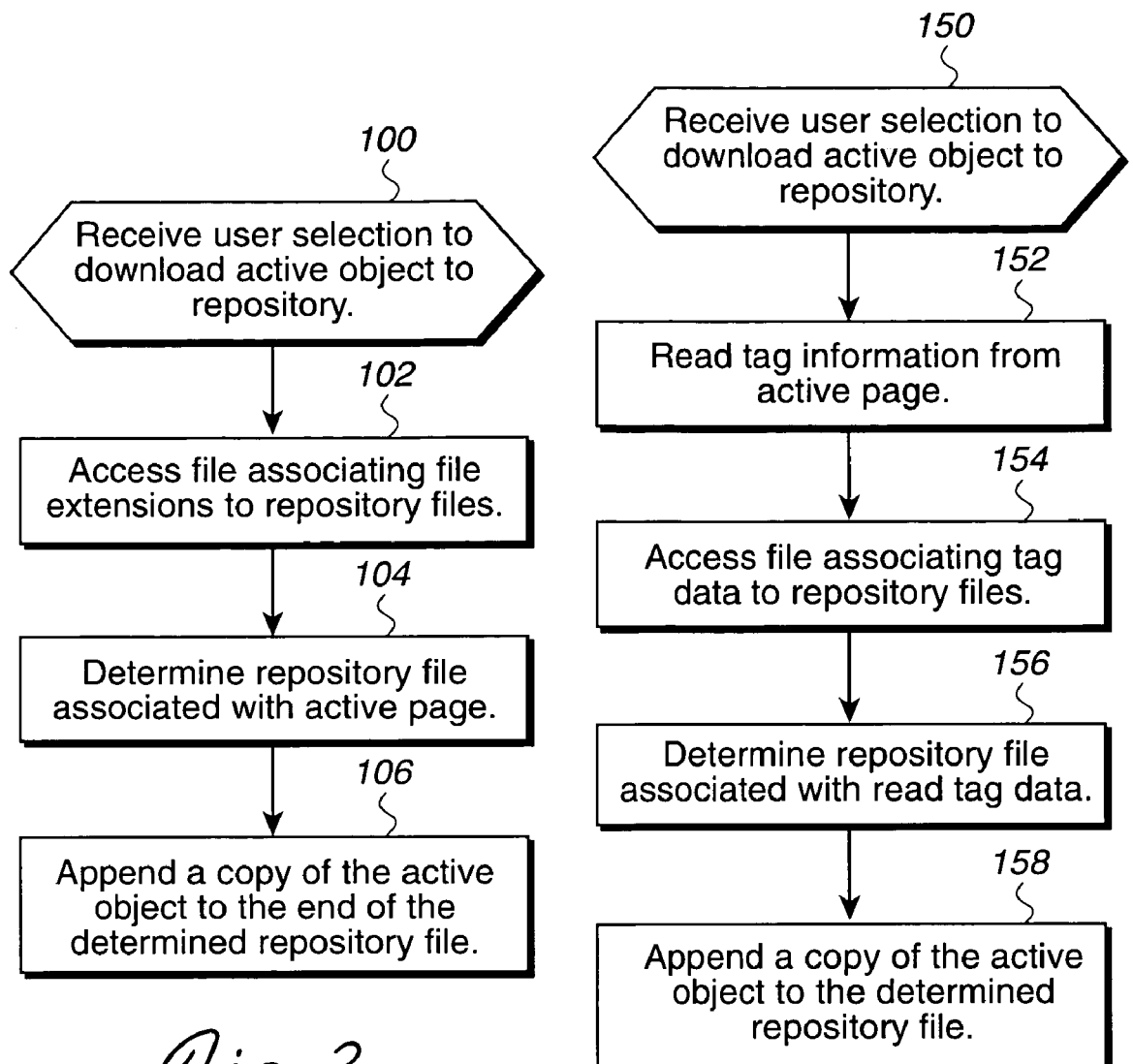

METHOD, SYSTEM, AND PROGRAM FOR SAVING OBJECT CONTENT IN A REPOSITORY FILE

BACKGROUND OF THE INVENTION

1. Field of the Invention

The present invention relates to a method, system, and program for saving content of objects displayed in a viewer program in a repository file for later review by the user.

2. Description of the Related Art

Oftentimes, when Internet users are "surfing" the Web, they may come upon a page they may want to retain for later viewing. To save such a page, the user would use the file menu items on browsers, such as the Microsoft Corporation Internet Explorer and Netscape Communications Corporation Netscape Navigator, and select the "file save" option. After selecting the "file save" menu item, the user must then specify a file name and directory location of where to store the currently viewed page.

Advertisements are presented to Internet users in at least two formats, banner advertisements and separate advertisement windows. A banner ad comprises HTML code embedded in a web page the user is viewing that typically displays a graphic identifying the advertiser. The displayed graphic typically includes a hypertext link such that if the user selects the displayed graphic, the web browser downloads the advertisement page at the hypertext link. With separate advertisement windows, when a user proceeds to a site, a separate browser window is opened including the advertisement page.

In both these situations, if the user is interested in the advertisement, then the user must select the banner ad graphic or advertisement window to view the advertisement page. The user would then have to use the "file save" menu item to save the advertisement page for later consideration. These operations that users must perform to save the content of an advertisement page requires the user to divert attention from the page they are currently viewing and perform multiple user interface operations to display the content in a separate file.

Thus, with the current browser art, users are discouraged from saving displayed content as the user may not want to divert attention to perform the save operation. There is thus a need in the browser art to allow users to save displayed content they are viewing that do not require the diversions and delays associated with current techniques for saving web pages, such as those techniques that use the file menu items on the web browser.

SUMMARY OF THE PREFERRED EMBODIMENTS

To overcome the limitations in the prior art described above, preferred embodiments disclose a method, system, and program for saving content of electronic objects displayed in a computer viewer program. Content of an object is presented in an interface generated by the viewer program. User selection of a command is received with respect to the presented object content. In response to the user selection of the command, a determination is made of a repository file. The content of the selected object is appended to the determined repository file. The repository file is capable of including content from multiple objects appended to the repository file in response to previous user selections of the command.

In further embodiments, the repository file includes content appended from objects downloaded from different servers.

In still further embodiments, there are a plurality of repository files. In such case, determining one repository file in which to append the content of the selected object further comprises determining one repository file associated with a file type of the selected object.

The object is capable of including content comprising text, images, video stream, sound stream, three dimensional images, and content of any other media type.

Preferred embodiments provide a method, system, and program to allow users of a viewer program to readily store displayed content by selection of a command. Further, the user may specify a repository file or one may be selected automatically from multiple repository files that store a particular class of content. This allows the user or viewer program to select a particular repository file to receive the selected content. The user may then open the repository file in the viewer program at a later time to review the content appended to the repository file. In this way, a user of a viewer program may save content to a repository file with the use of one command without having to divert attention from the current viewing activity. Preferred embodiments thus provide an improved technique for saving content when using a viewer program such as a web browser.

BRIEF DESCRIPTION OF THE DRAWINGS

Referring now to the drawings in which like reference numbers represents corresponding parts throughout:

FIGS. 3 and 4 illustrate logic implemented in the browser program to append content to a repository file in accordance with preferred embodiments of the present invention.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
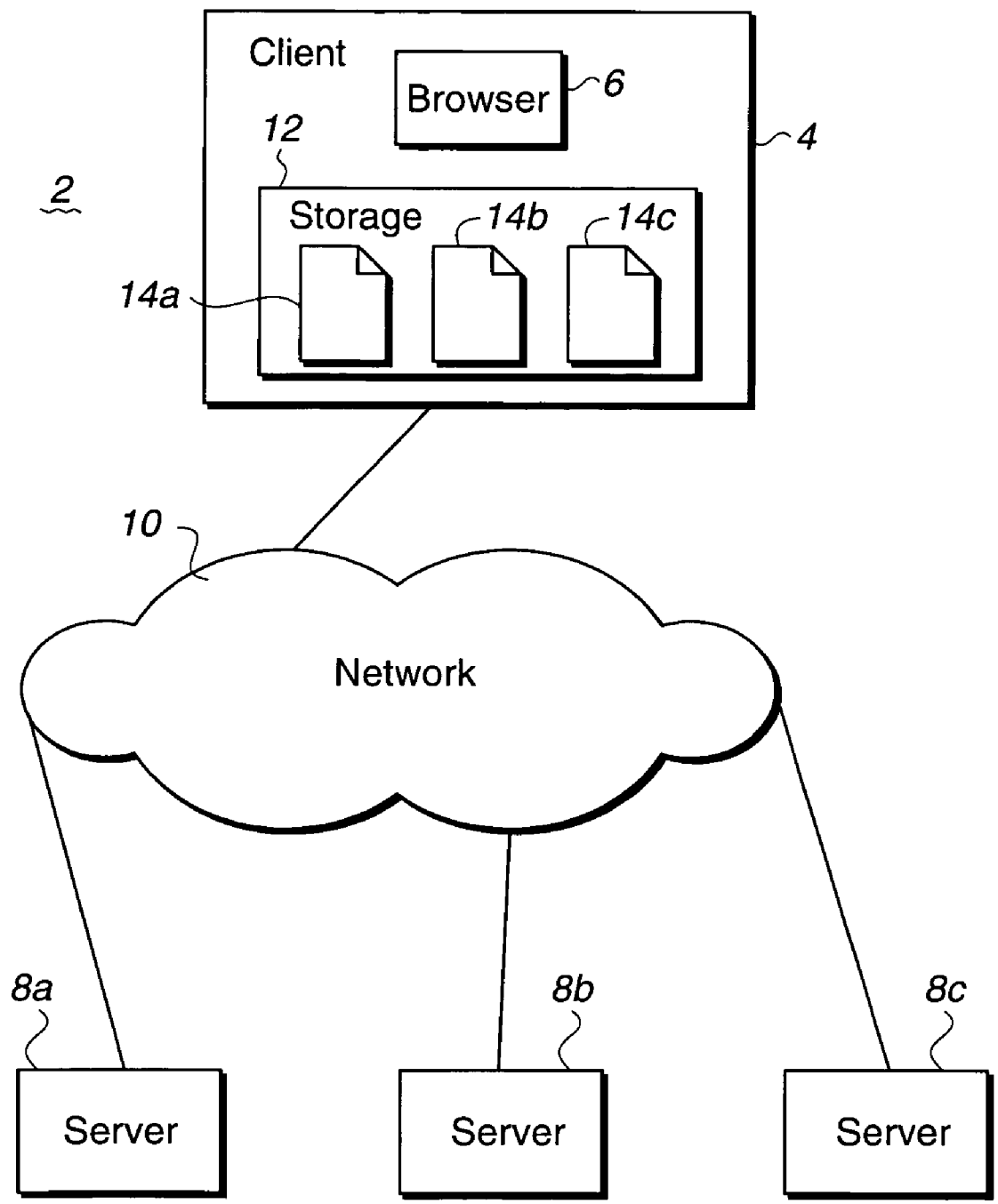
FIG. 1 illustrates a computing environment in which preferred embodiments are implemented.

FIG. 1 illustrates a computing environment in which preferred embodiments are implemented. The computing environment 2 includes at least one client computer 4 including a browser program 6, such as the Microsoft Explorer, Netscape Navigator, etc., that is capable of retrieving files from servers 8a, b, c over a network 10. The client computer 4 may comprise any computer system known in the art capable of executing a browser program. The servers 8a, b, c may comprise any computer system known in the art capable of maintaining files and making such files accessible to remote computers. The browser 6 and servers 8a, b, c communicate using a document transfer protocol such as the Hypertext Transfer Protocol (HTTP), or any other document transfer protocol known in the art, such FTP, Gopher, WAIS, etc. The network 10 may be a TCP/IP network, such as the Internet and World Wide Web, or any other network system known in the art, e.g., LAN, Ethernet, WAN, System Area Network (SAN), Token Ring, etc.

The client computer 4 includes an input device (not shown) through which the user may enter input data to control the operation of the browser program 6, such as a keyboard, mouse, pen-stylus, touch sensitive pad, touch sensitive screen, voice decoder for decoding voice commands, etc. In preferred embodiments, a user at the client computer 4 can input commands to control the browser program 6 through the graphical user interface (GUI) generated by the browser program 6 or input device controls, such as keyboard keys, mouse buttons, touch pad regions, that are programmed to cause the browser to perform specific operations.

Figure 2:
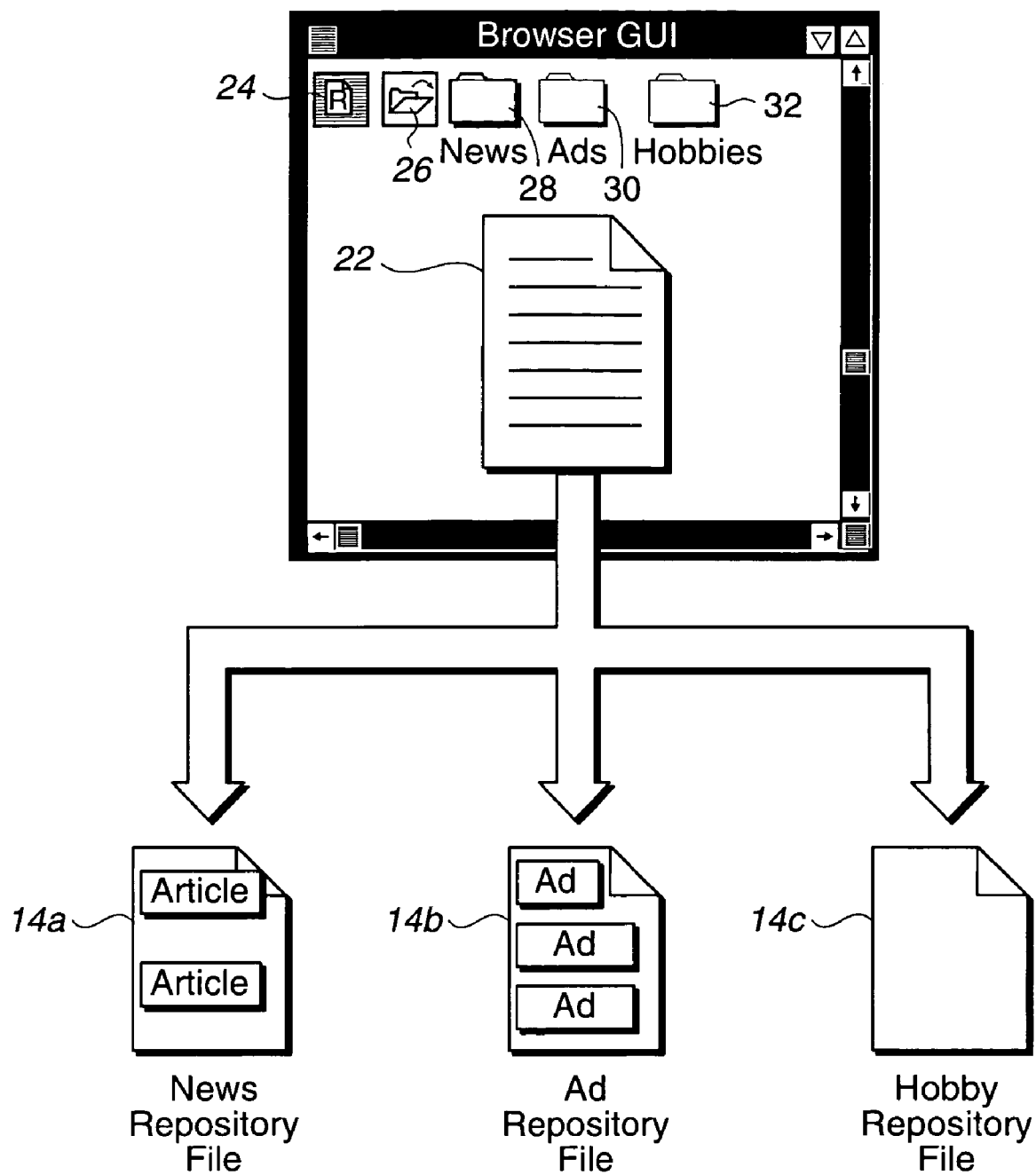
FIG. 2 illustrates a graphical user interface displayed by a browser program in accordance with preferred embodiments of the present invention.

The client computer 4 further includes a storage 12, preferably a non-volatile storage area such as a hard disk drive, maintaining one or more repository files 14a, b, c. FIG. 2 illustrates further details on the relationship of the browser program 6 and the repository files 14a, b, c. The browser program 6 displays a graphical user interface (browser GUI) 20 in which content 22 from a file downloaded from one of the servers 8a, b, c, such as an HTML page, is displayed. The browser GUI 20 displays graphical buttons 24, 26, 28, 30, and 32 to perform operations related to the repository files. The browser GUI 20 may also include a file menu and other graphical buttons that are typically included in web browser programs known in the art.

In preferred embodiments, the user may append the displayed content 22 into one of the repository files 14a, b, c. In this way, the repository files 14a, b, c store content from multiple files that may have been downloaded from one or more of the different servers 8a, b, c over the network 12. Alternatively, the content may originate from a file in local storage at the client 4. The repository files 14a, b, c may contain content from a plurality of pages, such as HTML web pages, merged into a single file. If the user were to open one of the repository files 14a, b, c into the display area of the browser program 6, then the user would be able to observe the content appended to the displayed repository file from different files.

Graphical button 24 is selected to create a new repository file to use to accumulate content displayed in the browser GUI 20. Graphical button 26 is selected to retrieve the content of a selected repository file 14a, b or c, which may include content from multiple files retrieved from different servers 8a, b, c. To append the displayed content 22 to one of the repository files 14a, b, c, the user would select one of the graphical buttons 28, 30, and 32. Selection of one of the graphical buttons 28, 30, and 32 would instruct and cause the browser program 6 to append the displayed content 22 to the repository file 14a, b, c associated with the selected graphical button 28, 30, and 32. In the example of the embodiments shown in FIG. 2, the news button 28 is associated with the news repository file 14a, the ads button 30 is associated with the advertisement (ad) repository file 14b and the hobby button 32 is associated with the hobby repository file 14c.

For instance, if the displayed content 22 is a newspaper article that the user wanted to store for later viewing, then the user would select the news button 28 to cause the browser program 6 to store the displayed content 22 in the news repository file 14a without any user involvement. Similarly, if the displayed content 22 was an advertisement, then the user would select the ad button 30 to append the displayed ad content 22 to the ad repository file 14b. In this way, the user may selectively store displayed content 22 in a selected repository file by using a single graphical button 28, 30 or 32.

Preferred embodiments are particularly useful if a user is reading the content of a web page including a banner advertisement embedded in the page or a separate advertisement window appears containing an advertisement page. If the user is interested in the advertisement but does not want to be distracted from reading the page, then the user may select the ad button 30 to cause the browser program 6 to append the advertisement content to the ad repository file 14b for later viewing. In this way, the user can readily and easily store a page that is displayed without interfering or diverting from the current activity being performed with another page displayed in the browser GUI 20.

If the ad button 30 is designed to work with banner ads embedded in a web page, then selection of the ad button 30 would cause the browser program 30 to extract all HTML code for the banner ads from the displayed page, as well as the hypertext link to the advertised site, and append the extracted HTML code for the banner ads to the repository file 14b for later viewing. In such embodiments, only the code in the web page implementing the banner ads are appended to the repository file 14b, whereas content in the page unrelated to the banner ads is not copied to the repository file 14b.

There are many ways in which the repository file invention can be implemented. The browser program 6 may include a setup panel that allows the user to add graphical buttons to the browser GUI 20 and associate such buttons with a repository file 14a, b, c into which a certain type of displayed content will be appended. The user may have the capability to select the directory path and file name of the repository file, or repository files may be stored in a default repository file directory. Alternatively, the browser program 6 setup panel may be used to program keys on the input device, such as specific keyboard or mouse keys, to append the displayed content into the repository file associated with such key.

In embodiments where the user programs the association of input mechanisms, such as keys, displayed graphical buttons, voice activated commands, etc., to a repository file, the user would select, through the input mechanism, the repository file to which a displayed page is to be appended. An input mechanism comprises any technique for the user to convey information to the viewer program, including selectable graphical elements displayed in the browser GUI 6 and input device components, such as keyboard keys (e.g., Alt-x, the F3 button, etc.), mouse keys, voice processing decoders, etc., that are capable of receiving user selection and transmitting a signal to the browser program 6 indicating the user selection.

In alternative embodiments, either the user or the browser program 6 may associate different file types, identified by their file extension, with a repository file. In such embodiments, selection of a single "append" command would cause the browser program 6 to append the selected page 22 to a repository file 14a, b, c associated with the file extension of the file including the content to append. For example, one repository file 14a may be associated with HTML files, another 14b may be associated with Graphics Interchange Format (GIF) files, and another 14c may be associated with Joint Photographic Expert Group (JPEG) files. FIG. 2 shows that the repository file 14a includes multiple articles appended thereto and that repository file 14b includes multiple advertisements, such as ad pages or banner ads, appended to thereto.

Selection of the "append" command or one of the graphical buttons 28, 30, 32 would append the entire displayed content 22 to the repository file 14a, b, c. Thus, if the displayed content included embedded objects, such as images, sound files, movie files, etc., the content of such embedded objects would also be appended to the repository file. Alternatively, the user may select with an input mechanism one of the objects embedded in the displayed content 22 to cause only that selected object to be appended to the repository file 14a, b, c. In this way, the user has the capability to select a particular object, e.g., sound files, movie files, pictures, etc., embedded in the displayed content to append to the repository file 14a, b, c.

FIG. 3 illustrates logic implemented in the browser program 6 to implement the repository function when each repository file 14a, b, c is associated with a particular file extension according to default settings in the browser program 6 or user specified associations of repository files to file extensions. Control begins at block 100 with the browser program 6 receiving user input selecting the append command to store the displayed content 22 or the content of a selected embedded object into one of the repository files 14a, b, c. Selection of the append command after the user has selected a particular embedded object in the displayed content 22 would cause the browser program 6 to save only the selected object, not the entire displayed content 22, in a repository file associated with the file type of the selected object.

After selection of the repository command, the browser program 6 would then access (at block 102) a file associating file extensions with repository files 14a, b, c. This file may have default associations provided by the browser program 6 or user defined associations of file extensions to repository files. The browser program (at block 104) would then determine from the file the repository file 14a, b, c associated with the file extension of the displayed content 22 or selected embedded object and append (at block 106) a copy of the selected content or object in the determined repository file.

In still further embodiments, determination of a repository file to use can be based upon information maintained in the selected displayed content 22 or selected object. For instance, pages written using HTML and extended mark-up (XML) may contain tags including information identifying the content or class of information of the displayed file. For such content, there would be an association of repository files with tag information. FIG. 4 illustrates logic implemented in the browser program 6 to select a repository file 14a, b, c in which to append the displayed content 22 or selected embedded object based on tag information in the content or object. Many of the steps are the same as those in FIG. 3, except that at block 152, the browser program 6 reads tag information from the active object, which may be the entire displayed HTML or XML page or an object therein. The browser program 6 then accesses (at block 154) the file associating tag information with repository files to determine the corresponding repository file to append the displayed content 22 or selected object. In this way, classification information entered into the tags of the content or object is used to determine the repository file in which to append the copy of the object.

In preferred embodiments, a copy of the displayed content is appended to the repository file 14a, b, c by copying the content of the object. For instance, if the content to append is an image file, then the image is copied to the repository file. If the content is HTML code, then the HTML code is appended to the repository file 14a, b, c. In the case of a repository file including content from multiple HTML pages, the repository file 14a, b, c would comprise a single file having the HTML code from the multiple pages appended. In the case of a sound file or movie file, the sound file or movie file may be embedded in the repository file. The browser program 6 may insert a graphical separator between appended content to allow the user to visually distinguish between the appended content from different files. In alternative embodiments, if the repository file is a sound or movie file, then the browser program 6 could append the sound or movie content stream to a repository stream of previously appended content streams, such that the repository file comprises a continuous stream of content. The browser program 6 may insert a separator between the content streams, such as a video or sound stream providing some separation to allow the user to distinguish between content.

In preferred embodiments, the user may use the open button 26 to display the content of a repository file 14a, b, c in order to observe, e.g., view, listen, etc., the contents thereof. If the repository file 14a, b, c includes non-HTML content, such as images, movie files, sound files, three dimensional images, etc., then the browser program 6 may include plug-in programs to present such non-HTML content in the browser GUI 20.

In preferred embodiments, the user may edit the contents of a repository file 14a, b, c opened in the browser GUI 20 by deleting appended content or even adding content. Still further, as discussed, the user may save a repository file in another location and start a new instance of the repository file.

ALTERNATIVE EMBODIMENTS AND CONCLUSIONS

The following describes some alternative embodiments for accomplishing the present invention.

The preferred embodiments may be implemented as a method, apparatus or program using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

Embodiments were discussed including particular graphical buttons to perform repository related operations, such as buttons 26, 28, 30, and 32, and other embodiments discussed the use of an append to repository input command to automatically determine a repository file to use. However, in further embodiments, the browser GUI 20 may display the append to repository button to provide for automatic selection of a repository file as well as the user specified graphical buttons, e.g., buttons 28, 30, and 32, to append the displayed page 22 to a user specified repository file, e.g., the news repository file 14a, the ad repository file 14b, and the hobby repository file 14c, associated with the selected graphical button 28, 30, and 32.

Preferred embodiments were described with respect to the HTTP protocol for transmitting documents between computers within a network. However, those skilled in the art will appreciate that the preferred embodiments may apply to any communication protocol for allowing a client to request and access files in a network environment.

Preferred embodiments were described with respect to appending HTML content to repository files. However, the objects that may be appended to the repository file may be in any file format known in the art for any media type, including any type of text, images, video, sound, three dimensional objects, etc.

Preferred embodiments were described with respect to a network environment in which pages are provided to a client from a server over a network, such as the Internet. However, in alternative embodiments, the objects or pages displayed in the browser GUI 20 and appended to a repository file 14a, b, c may have been accessed from local storage of the client computer 4.

In preferred embodiments, the files being searched are identified by a URL address and may be located on different servers connected over a common network such as the Internet. In alternative embodiments, any file addressing scheme may be used, including a file pathname indicating the location of a file in local storage. In such case, the preferred embodiments may be used to search for files located in local storage that are not dispersed throughout a network.

Preferred embodiments were described with respect to a browser program for displaying files downloaded from over a network, such as the Internet. However, in alternative embodiments, the browser program may be any viewer program, not just Internet web browsers, that are capable of accessing and displaying locally files retrieved from a server over a network.

In summary, the present invention provides a method, system, and program for saving content of electronic objects displayed in a computer viewer program. Content of an object is presented in an interface generated by the viewer program. User selection of a command is received with respect to the presented object content. In response to the user selection of the command, a determination is made of a repository file. The content of the selected object is appended to the determined repository file. The repository file is capable of including content from multiple objects appended to the repository file in response to previous user selections of the command.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

**Microsoft and Windows are registered trademarks of Microsoft Corporation; OS/2 is a registered trademark of International Business Machines Corporation; Netscape is a registered trademark and Netscape Communicator is a trademark of Netscape Communications Corporation.

What is claimed is:

1. A method for saving content of electronic objects displayed in a computer viewer program, comprising:
   presenting content in a page by the viewer program;
   presenting content of an object in a separate window from the page by the viewer program;
   receiving user selection of a command with respect to the presented content of the object; and
   performing, in response to the user selection of the command:
   (i) determining a repository file without user involvement, wherein there are a plurality of repository files, wherein determining the repository file in which to append the presented content further comprises at least one of:
      determining one repository file associated with a file type of the object; and
      determining one repository file associated with classification information embedded in the object; and
   (ii) appending content of the object to the determined repository file, wherein the repository file is capable of including content from multiple objects appended to the repository file in response to previous user selections of the command and wherein the content of each object included in the repository file corresponds to content selected by the user.

2. The method of claim 1, wherein the repository file includes content appended from objects downloaded from different servers over a network.

3. The method of claim 1, wherein determining the repository file in which to append the presented content further comprises:
   determining the classification information embedded in the object.

4. The method of claim 1, further comprising displaying one graphical button in a user interface, wherein the command is selected by receiving user input selecting the graphical button.

5. The method of claim 1, further comprising displaying a plurality of graphical buttons, wherein each button is associated with a different repository file, wherein user selection of the command comprises selection of one of the displayed graphical buttons, and wherein determining the repository file comprises determining the repository file associated with the selected graphical button.

6. The method of claim 5, wherein each repository file and corresponding graphical button is associated with a different class of object content, and wherein the repository files accumulate content appended from objects retrieved from different servers over a network.

7. The method of claim 1, wherein the command is selected by user selection of an input device mechanism.

8. The method of claim 1, wherein the object is capable of including content that is a member of the set of content comprising: text, images, video stream, sound stream, and three dimensional images.

9. The method of claim 1, wherein the presented content in the page includes embedded objects, further comprising:
   receiving user selection of one embedded object in the presented content in the page, wherein only the content of the selected embedded object is appended to the repository file in response to the user selection of the command.

10. A system for saving content of electronic objects displayed in a computer viewer program, comprising:
    means for presenting content in a page by the viewer program;
    means for presenting content of an object in a separate window from the page by the viewer program;
    means for receiving user selection of a command with respect to the presented content of the object; and
    means for performing, in response to the user selection of the command:

(i) determining a repository file without user involvement, wherein there are a plurality of repository files, wherein determining the repository file in which to append the presented content further comprises at least one of:
   determining one repository file associated with a file type of the object; and
   determining one repository file associated with classification information embedded in the object; and
(ii) appending content of the object to the determined repository file, wherein the repository file is capable of including content from multiple objects appended to the repository file in response to previous user selections of the command and wherein the content of each object included in the repository file corresponds to content selected by the user.

11. The system of claim 10, wherein the repository file includes content appended from objects downloaded from different servers over a network.

12. The system of claim 10, wherein the means for determining the repository file in which to append the presented content further comprises:
   means for determining the classification information embedded in the object.

13. The system of claim 10, further comprising means for displaying one graphical button in a user interface, wherein the command is selected by receiving user input selecting the graphical button.

14. The system of claim 10, further comprising means for displaying a plurality of graphical buttons, wherein each button is associated with a different repository file, wherein user selection of the command comprises selection of one of the displayed graphical buttons, and wherein the means for determining the repository file comprises means for determining the repository file associated with the selected graphical button.

15. The system of claim 14, wherein each repository file and corresponding graphical button is associated with a different class of object content, and wherein the repository files accumulate content appended from objects retrieved from different servers over a network.

16. The system of claim 10, wherein the command is selected by user selection of an input device mechanism.

17. The system of claim 10, wherein the object is capable of including content that is a member of the set of content comprising: text, images, video stream, sound stream, and three dimensional images.

18. The system of claim 10, wherein the presented content includes embedded objects, further comprising:
   means for receiving user selection of one embedded object in the presented content in the page, wherein only the content of the selected embedded object is appended to the repository file in response to the user selection of the command.

19. A computer readable medium for use in saving content of electronic objects displayed in a computer viewer program, wherein the computer readable medium includes code for causing a computer to perform:
   presenting content in a page by the viewer program;
   presenting content of an object in a separate window from the page by the viewer program;
   receiving user selection of a command with respect to the presented content of the object; and
   performing, in response to the user selection of the command:
      (i) determining a repository file without user involvement, wherein there are a plurality of repository files, wherein determining the repository file in which to append the presented content further comprises at least one of:
         determining one repository file associated with a file type of the object; and
         determining one repository file associate with classification information embedded in the object; and
      (ii) appending content of the object to the determined repository file, wherein the repository file is capable of including content from multiple objects appended to the repository file in response to previous user selections of the command and wherein the content of each object included in the repository file corresponds to content selected by the user.

20. The computer readable medium of claim 19, wherein the repository file includes content appended from objects downloaded from different servers over a network.

21. The computer readable medium of claim 19, wherein determining the repository file in which to append the presented content further comprises:
   determining the classification information embedded in the object.

22. The computer readable medium of claim 19, further comprising displaying one graphical button in a user interface, wherein the command is selected by receiving user input selecting the graphical button.

23. The computer readable medium of claim 19, further comprising displaying a plurality of graphical buttons, wherein each button is associated with a different repository file, wherein user selection of the command comprises selection of one of the displayed graphical buttons, and wherein determining the repository file comprises determining the repository file associated with the selected graphical button.

24. The computer readable medium of claim 23, wherein each repository file and corresponding graphical button is associated with a different class of object content, and wherein the repository files accumulate content appended from objects retrieved from different servers over a network.

25. The computer readable medium of claim 19, wherein the command is selected by a user selection of an input device mechanism.

26. The computer readable medium of claim 19, wherein the object is capable of including content that is a member of the set of content comprising: text, images, video stream, sound stream, and three dimensional images.

27. The computer readable medium of claim 19, wherein the presented content in the page includes embedded objects, further comprising:
   receiving user selection of one embedded object in the presented content in the page, wherein only the content of the selected embedded object is appended to the repository file in response to the user selection of the command.

* * * * *